United States Patent
Terashima

(10) Patent No.: US 7,111,311 B2
(45) Date of Patent: Sep. 19, 2006

(54) OPTICAL PICKUP DEVICE

(75) Inventor: Kentaro Terashima, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 489 days.

(21) Appl. No.: 10/726,365

(22) Filed: Dec. 2, 2003

(65) Prior Publication Data

US 2004/0111734 A1    Jun. 10, 2004

(30) Foreign Application Priority Data

Dec. 3, 2002    (JP) ............................... 2002-351621

(51) Int. Cl.
*G11B 7/08* (2006.01)
(52) U.S. Cl. ....................................... 720/671
(58) Field of Classification Search ................ 720/671; 369/112.08, 112.23
See application file for complete search history.

(56) References Cited

U.S. PATENT DOCUMENTS 6,781,946 B1 *    8/2004    Murata et al. ......... 369/112.23

6,857,125 B1 *    2/2005    Makino et al. ............. 720/671
7,050,379 B1 *    5/2006    Takahashi et al. ...... 369/112.08

FOREIGN PATENT DOCUMENTS

JP    05-258336    10/1993
JP    2001-067700    3/2001

OTHER PUBLICATIONS

Web Report, DuPont FEP.*

* cited by examiner

*Primary Examiner*—Tianjie Chen
(74) *Attorney, Agent, or Firm*—David G. Conlin; William J. Daley, Jr.; Edwards Angell Palmer & Dodge LLP

(57) ABSTRACT

A shock absorber includes a projection that projects toward an optical disk and projects out of a surface of an objective lens facing the optical disk to prevent collision of the objective lens and the optical disk. The shock absorber has a surface resistivity of not more than $10^{10}$ Ω at least for the projection. In this way, the shock absorber (projection) will not be electrified when the optical disk and the shock absorber (projection) collide with each other, and accordingly the shock absorber (projection, in particular) does not attract dust or particles. As a result, the dust or particles do not damage the optical disk even when the optical disk and the shock absorber (projection) collide again.

6 Claims, 8 Drawing Sheets

OPTICAL PICKUP DEVICE

This Nonprovisional application claims priority under 35 U.S.C. § 119(a) on Patent Application No. 2002/351621 filed in Japan on Dec. 3, 2002, the entire contents of which are hereby incorporated by reference.

FIELD OF THE INVENTION

The present invention relates to optical pickup devices that project a semiconductor laser beam on an information recording medium, for example, such as an optical disk, to record information in a recording face of the information recording medium, or to reproduce information recorded in the recording face of the information recording medium.

BACKGROUND OF THE INVENTION

In the field of information recording, there has been ongoing research on optical information recording. The optical information recording has a number of advantages, including the ability to record and reproduce information non-contact, and compatibility to different memory formats, including read-only, write-once, and rewritable memories, in addition to inexpensively realizing large storage media. Thus, the optical information recording is expected to have a wide variety of applications, including industrial and consumer applications.

A recent research trend for optical disk devices using optical information recording has been to increase the information recording capacity per unit area of the de facto standard optical disks (for example, optical disks with a 120 mm diameter, including CD and DVD), and to realize smaller optical disks and optical disk devices.

The information recording capacity per unit area can be increased by reducing the wavelength of a light source, or by increasing the numerical aperture (NA) of an objective lens.

The recent development of a blue laser has made a great contribution in reducing the wavelength of a light source. However, a further reduction has been impeded by the absorption of light by the optical components. Common materials of the optical components are glass and plastic. As a general rule, materials with good workability (low melting point) have a longer wavelength of absorption limit. For example, plastics, which have a lower melting point than common glass and provide better workability, have a wavelength of absorption limit in a range of 300 nm to 400 nm, which is longer than that of common glass ranging from 200 nm to 300 nm. Thus, in mass-produced optical components using plastic (or glass with good workability), the light source is limited to a particular range of wavelength that can be absorbed.

As to increasing the NA of a lens, the NA can be increased by designing. However, in a lens with a high NA, the distance between the objective lens and the optical disk ("working distance" hereinafter) is as short as about 0.1 mm, and at most about 0.5 mm, which is shorter than that in conventional lenses of CDs and DVDs.

Thus, the objective lens and the optical disk collide when vibrations or other disturbances caused when the device is used in mobile applications move the objective lens out of the proper position determined by the focusing servo control. As a result, the surface of the objective lens is damaged, impairing optical characteristics, such as transmittance of the objective lens or aberration characteristics.

Japanese Publication for Unexamined Patent Application No. 67700/2001 (Tokukai 2001-67700) (published on Mar. 16, 2001) ("Publication 1" hereinafter) discloses a technique for solving such a problem. As illustrated in FIG. 8, this publication proposes a structure including an objective lens 66 composed of a first lens 61 and a second lens 62, and a lens holder 63 holding the first lens 61 opposite an optical disk (not shown), wherein the lens holder 63 has a shock absorber 63a that projects out of the surface of the first lens 61 toward the optical disk. Note that, indicated by the reference numeral 64 is the holder for a second lens 62.

With this structure, even when external vibrations or other disturbances move the objective lens 66 out of the proper position determined by the focusing servo control (not shown), only the shock absorber 63a is in contact with the optical disk and the first lens 61 does not directly collide with the optical disk. As a result, damage to the first lens 61 is prevented, thereby preventing deterioration of optical characteristics, such as transmittance of the objective lens 60 or aberration characteristics, caused when the objective lens 60 is damaged.

Japanese Publication for Unexamined Patent Application No. 258336/1993 (Tokukaihei 5-258336) (published on Oct. 8, 1993) ("Publication 2" hereinafter) discloses a technique for protecting the surface of the objective lens from dirt such as dust.

FIG. 9 illustrates a structure disclosed in this publication. As illustrated in FIG. 9, the publication provides an antistatic, oil-repellent, and lubricative protective-coating 71 on the surface of an objective lens 69 facing an optical disk 77. Such an antistatic coating is generally provided by ITO, for example.

With this structure, dust does not contaminate the objective lens 69, thereby preventing deterioration of optical characteristics, such as transmittance of the objective lens 69 or aberration characteristics.

Another problem of the collision of the objective lens and the optical disk is that the surface of the objective lens is electrified by the static charge generated by the collision. This is even more problematic than physically damaging the objective lens and/or the optical disk.

The charge on the surface of the objective lens attracts dust, and the dust or other particles adhered on the surface of the objective lens impairs the optical characteristics of the objective lens. Further, when the objective lens collides again with the optical disk, the dust or particles damage the objective lens and the optical disk. This causes a secondary problem that error is caused in recording or reading signals (information) in and from the optical disk.

The problem is not solved by the technique disclosed in Publication 1. In fact, Publication 1 does not even consider that the shock absorber 63a (see FIG. 8) becomes electrified by the generated charge of the collision with the optical disk, or that the generated charge attracts dust, nor does it consider the adverse effect of dust on the optical pickup. This is clear from the fact that Publication 1 does not even indicate that the shock absorber 63a serves to prevent charge, even though it does disclose examples of a material for the shock absorber 63a, including elastic materials such as rubber and felt, and resin.

That is, the collision of the shock absorber and the optical disk does not damage the objective lens 66 (first lens 61 in particular) but the shock absorber 63a is statically charged when it collides with the optical disk rotating at a high speed, thereby charging the surface of the shock absorber 63a. The charged surface of the shock absorber 63a attracts dust, and the dust or particles adhered to the surface of the shock absorber 63a are likely to damage the optical disk when the shock absorber 63a and the optical disk collide again. The problem becomes particularly serious when an objective lens 66 with a high NA is used, because in this case the damaged surface of the optical disk causes noise and generates errors in recording or reading information in and from the optical disk.

This is expected to become even more problematic in the future when the information recording density of the optical disk is increased and the working distance is reduced to cause the optical disk and the shock absorber 63*a* to collide more frequently.

In the optical system disclosed in Publication 2, the provision of the protective coating 71 having an antistatic property on the surface of the objective lens 69 facing the optical disk 77 prevents dust or particles from contaminating the objective lens 69. However, this system assumes that the objective lens 69 and the optical disk 77 are distanced from each other, and does not even consider the possibility that the optical disk 77 collides with the protective coating 71.

Thus, when the optical disk 77 frequently collides with the protective coating 71 as in the case where the objective lens 69 has a high NA, it is highly likely that the protective coating 71 is detached, with the result that the effect of the protective coating 71 as a protective film, protecting the objective lens 69 from dust, is quickly lost. The protective coating 71, when it is completely detached or even partly detached and remains on the surface of the objective lens 69, influences the focusing characteristics of the objective lens 69 with a high NA. That is, a sufficiently small focusing spot cannot be obtained.

Publication 1 and Publication 2 may be combined to obtain a structure in which the shock absorber is provided in the vicinity of the objective lens with the protective coating. However, even in this structure, the shock absorber is still charged when the optical disk and the shock absorber collide with each other, and the generated charge attracts dust or particles to the shock absorber. As a result, the optical disk is damaged when the shock absorber collides with the optical disk again. When the objective lens has a NA of 0.8 or greater, even a small scratch on the optical disk causes errors in recording and reading information.

That is, damage to the optical disk and the shock absorber still occurs in a structure combining the conventional techniques disclosed in Publication 1 and Publication 2.

SUMMARY OF THE INVENTION

The present invention was made in light of the anticipation that an optical disk with increased recording density has an increased chance of colliding with a shock absorber, and it is an object of the present invention to provide an optical pickup device that prevents the shock absorber (projection) from being electrified when it collides with the optical disk, so that dust or particles are not attracted to the shock absorber (projection in particular), and therefore do not damage the optical disk when the shock absorber (projection) collides with the optical disk again.

In order to achieve this object, an optical pickup device according to the present invention includes: a light source; an objective lens for focusing light of the light source onto an optical disk; and a shock absorber including a projection that projects toward a recording medium and projects out of a surface of the objective lens facing the recording medium, for preventing collision of the objective lens and the recording medium, the shock absorber having a surface resistivity of not more than $10^{10}$ Ω at least for the projection.

The optical pickup device includes, for example, a photoreceptor element for receiving reflected light from a light source such as a semiconductor laser, a lens system such as an objective lens, and a recording medium, and carries out recording and reproducing of signals (information) with respect to a recording medium such as CD, DVD, CD-R, MO, and DVD-RAM.

In the optical pickup device, the light emitted by the light source travels through the lens system and enters the objective lens. Through the objective lens, the light is focused on the recording medium.

Accordingly, the recording medium and the objective lens are in close proximity to each other. The distance between the recording medium and the objective lens becomes even shorter particularly when a high NA lens (objective lens) is designed for high density recording. This may cause the objective lens and the recording medium to frequently collide with each other when the objective lens or the recording medium is moved in a focusing direction by external vibrations or other disturbances transmitting to the objective lens, or to the optical disk via a rotation shaft.

With the foregoing structure, because the shock absorber includes a projection that projects toward a recording medium and projects out of the surface of the objective lens facing the recording medium, the recording medium does not collide with the objective lens but collides with the projection when external vibrations or other disturbances move the objective lens out of the proper position determined by the focusing servo control. In this manner, the objective lens and the recording medium are prevented from directly colliding with each other.

As a result, the objective lens will not be damaged. Further, since the point of contact between the recording medium and the shock absorber is the projection having a relatively smooth surface, the recording medium is unlikely to be damaged by the contact with the projection.

According to the foregoing configuration, the shock absorber has a surface resistivity of not more than $10^{10}$ Ω at least for the projection.

As the term is used herein, the "surface resistivity" is the ratio of electric field to current density in the electric field on a surface of a material.

The projection with a surface resistivity of not more than $10^{10}$ Ω provides a long mean free path for the free electrons on the surface of the shock absorber (projection, in particular), and accordingly the generated local charges when the projection is in contact with the recording medium spread over the surface of the shock absorber in a shorter period of time as compared with, for example, the projection with a surface resistivity exceeding $10^{10}$ Ω, as in the case where ABS resin (surface resistivity of $10^{16}$ Ω) or styrene (surface resistivity of $10^{15}$ Ω) is used for the shock absorber (projection).

As a result, the projection will not be electrified even when the recording medium is in contact with the projection, and the charge of the projection does not attract dust or particles to the projection.

That is, dust or particles do not adhere to the projection by the charge generated when the recording medium is in contact with the projection, and the recording medium will not be damaged even when the projection collides again with the recording medium.

As a result, signals (information) can be recorded or reproduced without errors caused by the damage to the recording medium.

For a fuller understanding of the nature and advantages of the invention, reference should be made to the ensuing detailed description taken in conjunction with the accompanying drawings.

DESCRIPTION OF THE EMBODIMENTS

Embodiments of the present invention are described below with reference to FIG. 1 through FIG. 7

[First Embodiment]

Figure 2:
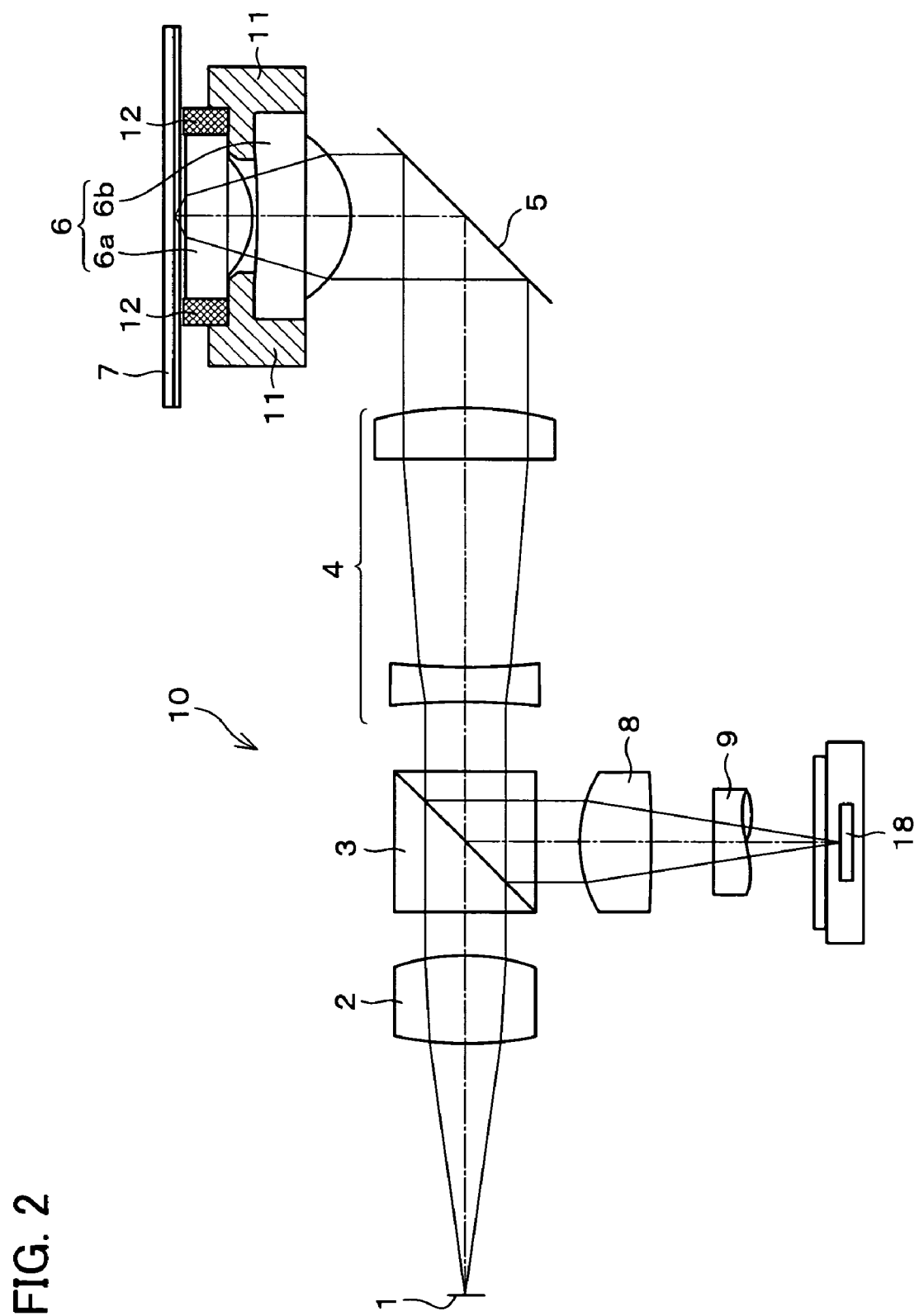
FIG. 2 is a schematic view illustrating a structure of the optical pickup device of FIG. 1.

FIG. 2 illustrates an optical system for an optical pickup device in one embodiment of the present invention. As shown in FIG. 2, the optical system for an optical pickup device 10 includes a semiconductor laser (light source) 1, a collimating lens 2, a light splitting element 3, a beam expanding element 4, a deflecting mirror 5, an objective lens 6 (first lens 6a, second lens 6b), an optical disk (recording medium) 7, a spot lens 8, a cylindrical lens 9, a photoreceptor element 18, an objective-lens holder 11, and a shock absorber 12.

In the optical pickup device 10, the light from the semiconductor laser 1 (light source) is converted into a parallel ray through the collimating lens 2 and enters the light splitting element 3. Through the light splitting element 3, the light beam is incident on the beam expanding element 4 where the diameter of the light beam is increased. Then, the light beam changes the direction of its optical path on the deflecting mirror 5, and is focused on the optical disk 7 (recording medium) as it pass through the objective lens 6 of the dual lens structure.

The reflected light from the optical disk 7 travels back along the optical path of the incident light and reflects at the light splitting element 3. The light is focused as it passes through the spot lens 8 and, through the cylindrical lens 9, falls on the photoreceptor element 18 that includes a multiplicity of divided photoreceptors on a single plane. The photoreceptor element 18 detects a recording signal and a servo signal.

Figure 1:
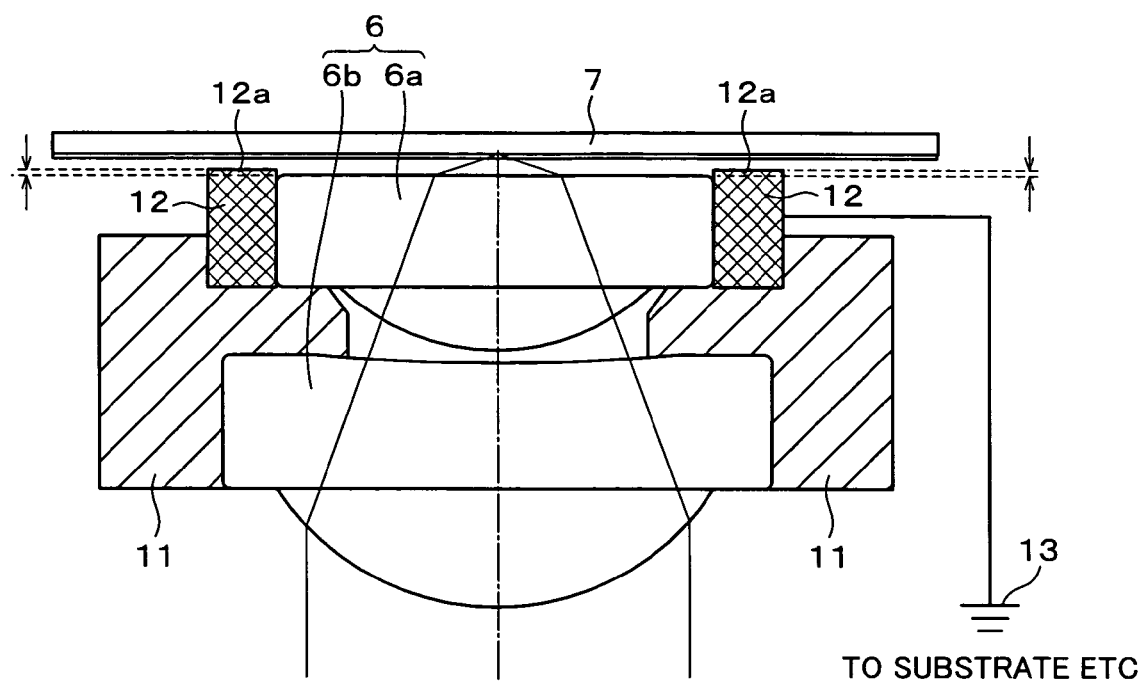
FIG. 1 is a longitudinal section schematically showing a structure in the vicinity of an objective lens in an optical pickup device in one embodiment of the present invention.

FIG. 1 is a magnified view of the optical system for the optical pickup device 10, showing an area around the objective lens 6.

The objective lens 6 includes a first lens 6a provided opposite the optical disk 7, and a second lens 6b provided behind the first lens 6a. The first lens 6a and the second lens 6b are held in place by the objective lens holder 11 with a predetermined distance in between.

Around the first lens 6a is provided the shock absorber 12 of a hollow cylindrical shape that serves to absorb shock. A portion of the shock absorber 12 on the side of the optical disk 7 projects out of the plane of the surface of the first lens 6a facing the optical disk 7, extending toward the optical disk 7. This portion of the shock absorber 12 is a projection 12a of the shock absorber 12.

The shock absorber 12 has an antistatic property, which is rendered by the antistatic material used for the shock absorber 12. The antistatic material includes those materials with a surface resistivity of not more than $10^{10}$ Ω, which is known to exert a certain level of antistatic effect. Specific examples of such antistatic materials include various industrial plastics as represented by PETMAX (registered trademark; provided by TOYOBO Co., Ltd.) and ST-Poly (registered trademark; provided by Achilles Co., Ltd), and composite plastics prepared by kneading plastic with conductive carbon.

Because the shock absorber 12 projects out of the plane of the surface of the first lens 6a of the objective lens 6 toward the optical disk 7, the optical disk 7 does not collide with the first lens 6a but collides with the shock absorber 12 (projection 12a) when external vibrations or other disturbances move the objective lens 6 out of the proper position determined by the focusing servo control. In this manner, the objective lens 6 and the optical disk 7 are prevented from colliding with each other, thus preventing damage to the objective lens 6 or the optical disk 7.

Further, because the shock absorber 12 is made of an antistatic material, the shock absorber 12 (particularly, the projection 12a) will not be charged even when the projection 12a collides with the optical disk 7. As a result, no duct or particle adheres to the projection 12a by the charge of the shock absorber 12 (particularly, projection 12a). In this manner, the charge generated by the collision of the optical disk 7 and the projection 12a does not attract dust or particles to the projection 12a, thereby preventing the optical disk 7 from being damaged by dust or particles when the optical disk 7 collides again with the projection 12a.

In the following, description is made more specifically as to the advantage of using an antistatic material for the shock absorber 12.

Conventionally, the collision of the objective lens 6 (or shock absorber 12) and the optical disk 7 generates local charges on the surfaces of the objective lens 6 (or shock absorber 12) and the optical disk 7. Over time, these local charges spread over the respective surfaces. The time required for the local charges to spread is long in materials with a high surface resistivity such as plastic (for example, the surface resistivity is $10^{16}$ Ω or greater for ABS (acrylonitorile-butadiene-styrene), about $10^{15}$ Ω for styrene, and about $10^{14}$ Ω for PVC (polyvinyl chloride)), because the mean free path for the free electrons on the surfaces of these materials is short.

In this case, when the objective lens 6 (or shock absorber 12) is expected to frequently collide with the optical disk 7 as in the case of using a lens designed with a high NA, there is a strong likelihood that the objective lens 6 (or shock absorber 12) collides again with the optical disk 7 before the local charges have time to spread. More specifically, as illustrated in FIG. 7(a) through FIG. 7(f), when an objective lens 60 and an optical disk 70 spaced apart from each other with a certain distance as shown in FIG. 7(a) collide with each other as illustrated in FIG. 7(b) (first collision), local charges 50 are generated on the objective lens 60 as shown in FIG. 7(c). The local charges 50 attract air-borne dust/particles 40 onto the objective lens 60 as shown in FIG. 7(d), and the objective lens 60, bearing the dust/particles 40, collides with the optical disk 70 as shown in FIG. 7(e). The collision creates irregularities on the collided surfaces of the objective lens 60 and the optical disk 70, thereby damaging the objective lens 60 and the optical disk 70. The dust/particles 40 adhered on the objective lens 60 remain thereon even after the collision, as shown in FIG. 7(f). Thus, when the collision occurs repeatedly in the manner shown in FIG. 7(a) through FIG. 7(f), the objective lens 60 and the optical disk 70 are even more damaged.

On the other hand, in the present embodiment, the antistatic material (for example, conductive material) used for the shock absorber 12 provides a long mean free path for the free electrons on the material surface, and the local charges, which generate on the respective surfaces of the projection 12a and the optical disk 7 by the collision of these two members, spread over the surface of the shock absorber 12 in a short period of time. As a result, the local charges are less likely to attract air-borne dust and particles onto the shock absorber 12.

Thus, even when the shock absorber 12 and the optical disk 7 collide again shortly after, the probability that the shock absorber 12 collides with the optical disk 7 with dust and particles is small. Accordingly, the optical disk 7 is less likely to be damaged.

As a result, signals can be recorded or reproduced without errors caused by damage (cause of noise) to the optical disk 7. This is particularly effective when the objective lens 6 has a high NA for high density recording.

As described, the use of a conductive material allows the local charges to spread over the material surface in a short period of time. The charges can be removed even more effectively by grounding the shock absorber 12 in the manner shown in FIG. 1, so that the generated surface charges (local charges) are drained into a housing 17 supporting the objective lens holder 11.

In this way, the charges can escape into the housing 17, which is more conductive than the material of the shock absorber 12, thereby more quickly canceling the generated surface charges (local charges) of the collision.

Figure 3:
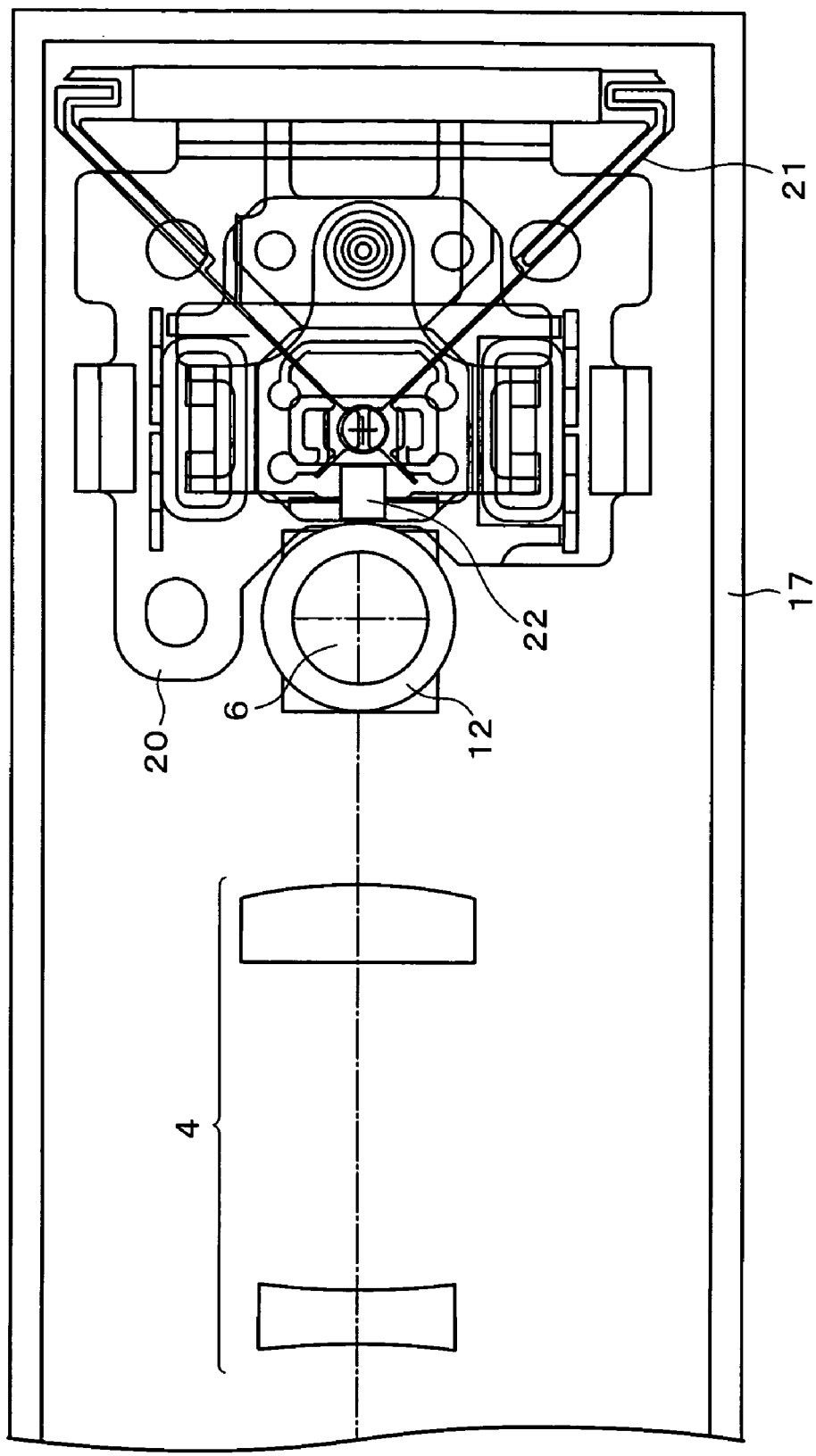
FIG. 3 is a plan view illustrating a structure of the optical pickup device of FIG. 1.

Here, the method of making an electrical connection between the shock absorber 12 and the housing 17 is not just limited to direct wiring. For example, the shock absorber 12 may be connected to a conductive spring 21 that movably supports the objective lens 6 in the directions of focusing and tracking as shown in FIG. 3, so that the shock absorber 12 is conducted to the housing 17 through the conductive spring 21 and an actuator substrate 20. The surface charges (local charges) can also be removed this way.

In the present embodiment, the shock absorber 12 is fixed on the objective lens holder 11. However, the present invention is not just limited to this embodiment, and the shock absorber 12 may be directly fixed on the objective lens 6.

Further, in the present embodiment, the shock absorber 12 is cylindrical. However, the present invention is not just limited to this embodiment, and the shock absorber 12 may be shaped into a cylindrical shape with an end of the shock absorber 12 curved outward towards the optical disk 7. This is preferable because the shock absorber 12 should preferably have a shape that minimizes the pressure it exerts on the optical disk 7 when the shock absorber 12 contacts the optical disk 7.

Further, even though the shock absorber 12 is made of industrial plastic or composite plastic, the present invention is not just limited to this embodiment. For example, resin, rubber, fabric, or any other material may be used as long as it is antistatic.

Further, in the present embodiment, the objective lens may have any numerical aperture. However, the described effects of the present invention become more prominent when the objective lens used in the optical pickup device 10 has a numerical aperture of not less than 0.8, because in this case the optical disk 7 and the objective lens 6 (or shock absorber 12) collide more frequently as a result of the reduced working distance.

Further, since the beam expanding element 4 shown in FIG. 2 is provided to compensate for the spherical aberration caused by an uneven thickness of the cover glass, the beam expanding element 4 may be realized by spherical aberration compensating means using a liquid crystal driving element.

Further, even though the objective lens 6 is a dual lens in the described embodiment, the present invention is not just limited thereto. For example, the objective lens 6 may be realized by an optical system using a single lens.

[Second Embodiment]

Figure 4:
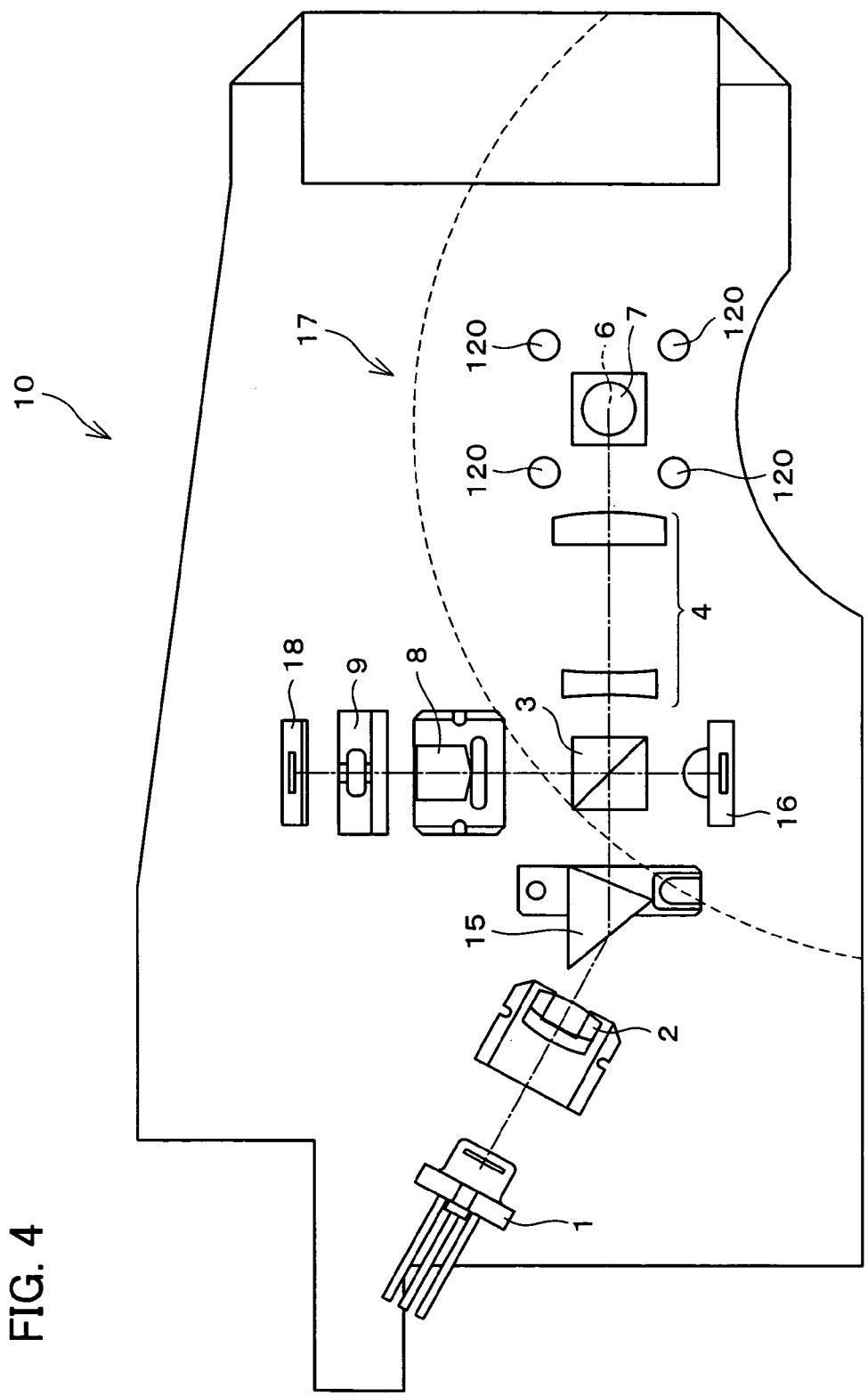
FIG. 4 is a plan view illustrating a structure of an optical pickup device in another embodiment of the present invention.

FIG. 4 illustrates an optical system for an optical pickup device in a Second Embodiment of the present invention.

The light from a semiconductor laser 1 (light source) is converted into a parallel ray through a collimating lens 2 and enters a light splitting element 3. Through the light splitting element 3, the light beam is incident on a beam expanding element 4 where the diameter of the light beam is increased. Then, the light beam changes the direction of its optical path on a deflecting mirror (not shown), and is focused on an optical disk 7 as it pass through an objective lens 6 of the dual lens structure. The reflected light from the optical disk 7 travels back along the optical path of the incident light and reflects at the light splitting element 3. The light is focused as it passes through a spot lens 8 and, through a cylindrical lens 9, falls on a photoreceptor element 18 that includes a multiplicity of divided photoreceptors on a single plane. The photoreceptor element 18 detects a recording signal and a servo signal. The reflected light from the light splitting element 3 is incident on a power control photoreceptor element 16, and is used for the feedback control of the laser power from the semiconductor laser 1.

Figure 5:
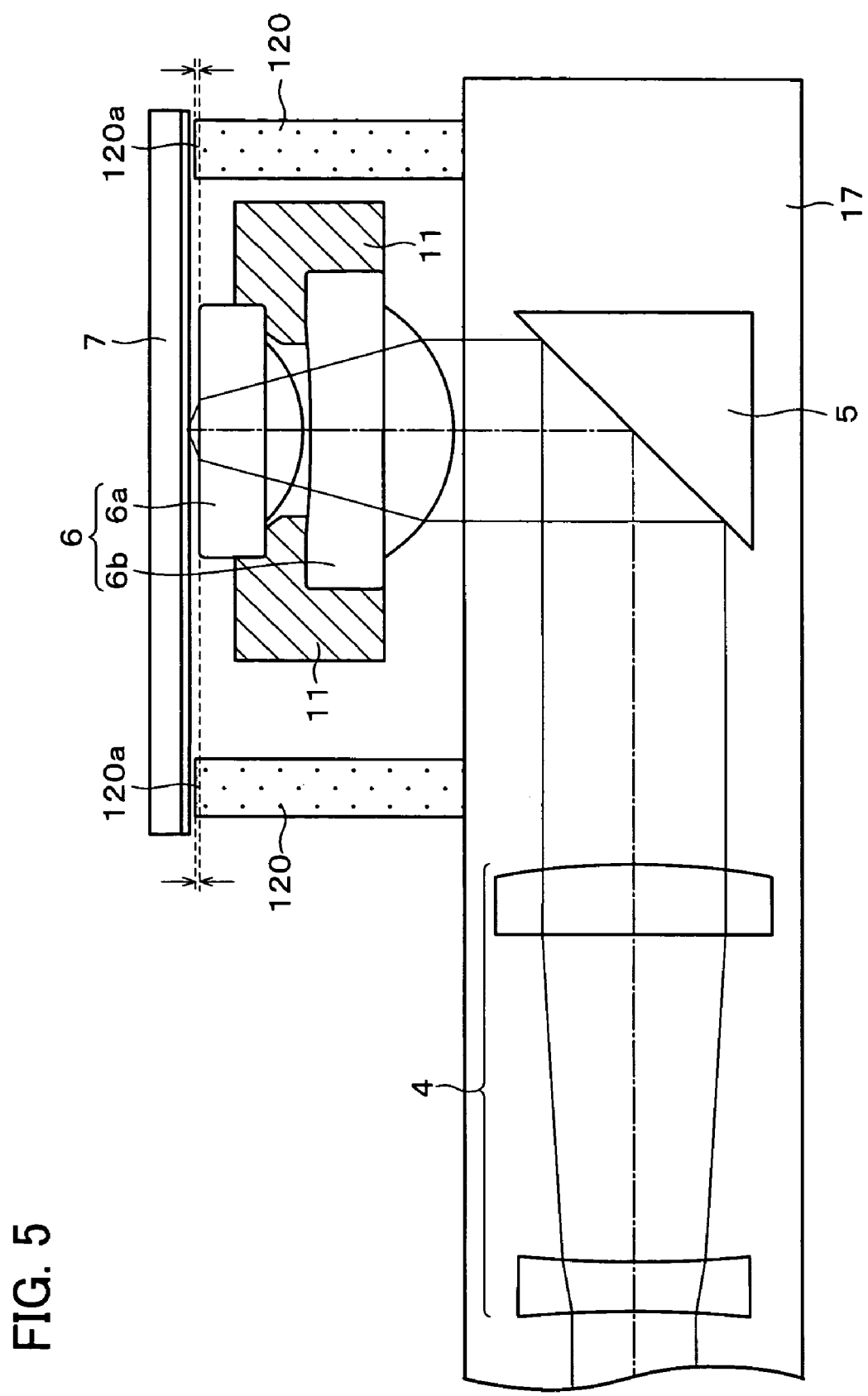
FIG. 5 is a longitudinal section schematically showing a structure in the vicinity of an objective lens in an optical pickup device in another embodiment of the present invention.

FIG. 5 is a magnified view of the optical system for the optical pickup device 10, showing an area around the objective lens 6.

The objective lens 6 includes a first lens 6a provided opposite the optical disk 7, and a second lens 6b provided behind the first lens 6a. The first lens 6a and the second lens 6b are held in place by an objective lens holder 11 with a predetermined distance in between.

Around the first lens 6a is provided a shock absorber 120, which is realized by four pillars and serves to absorb shock. A portion of the shock absorber 120 on the side of the optical disk 7 projects out of the plane of the surface of the first lens 6a facing the optical disk 7, extending toward the optical disk 7. This portion of the shock absorber 120 is a projection 120a of the shock absorber 120.

The shock absorber 120 of a pillar shape is fixed by a method such as bonding or press-fitting on the surface of a housing 17 facing the optical disk 7 (upper surface of the housing supporting the objective lens holder 11). The height of the shock absorber 120 is below the lower surface of the optical disk 7 and above the surface of the objective lens 6 facing the optical disk 7.

The shock absorber 120 has an antistatic property. The antistatic property of the shock absorber 120 is rendered by an antistatic material with a surface resistivity of, for example, not more than $10^{10}$ Ω, examples of which includes industrial plastics as represented by PETMAX (registered trademark; provided by TOYOBO Co., Ltd.) and ST-Poly (registered trademark; provided by Achilles Co., Ltd), or composite plastics prepared by kneading plastic with conductive carbon.

Because the shock absorber 120 projects out of the plane of the surface of the first lens 6a of the objective lens 6 toward the optical disk 7, the optical disk 7 does not collide with the first lens 6a but collides with the shock absorber 120 (projection 120a) when external vibrations or other disturbances move the objective lens 6 out of the proper position determined by the focusing servo control. In this manner, the objective lens 6 and the optical disk 7 are prevented from colliding with each other, thus preventing damage to the objective lens 6 or the optical disk 7.

Further, because the shock absorber 120 is made of an antistatic material, the shock absorber 120 (particularly, the projection 120a) will not be electrified even when the projection 120a collides with the optical disk 7. Further, since the projection 120a is electrically connected to the housing 17, the charge can escape into the housing 17.

As a result, no duct or particle adheres to the projection 120a by the charge of the shock absorber 120 (particularly, projection 120a).

In this manner, the charge generated by the collision of the optical disk 7 and the projection 120a does not attract dust or particles to the projection 120a, thereby preventing the optical disk 7 from being damaged by dust or particles when the optical disk 7 collides again with the projection 120a.

Figure 6:
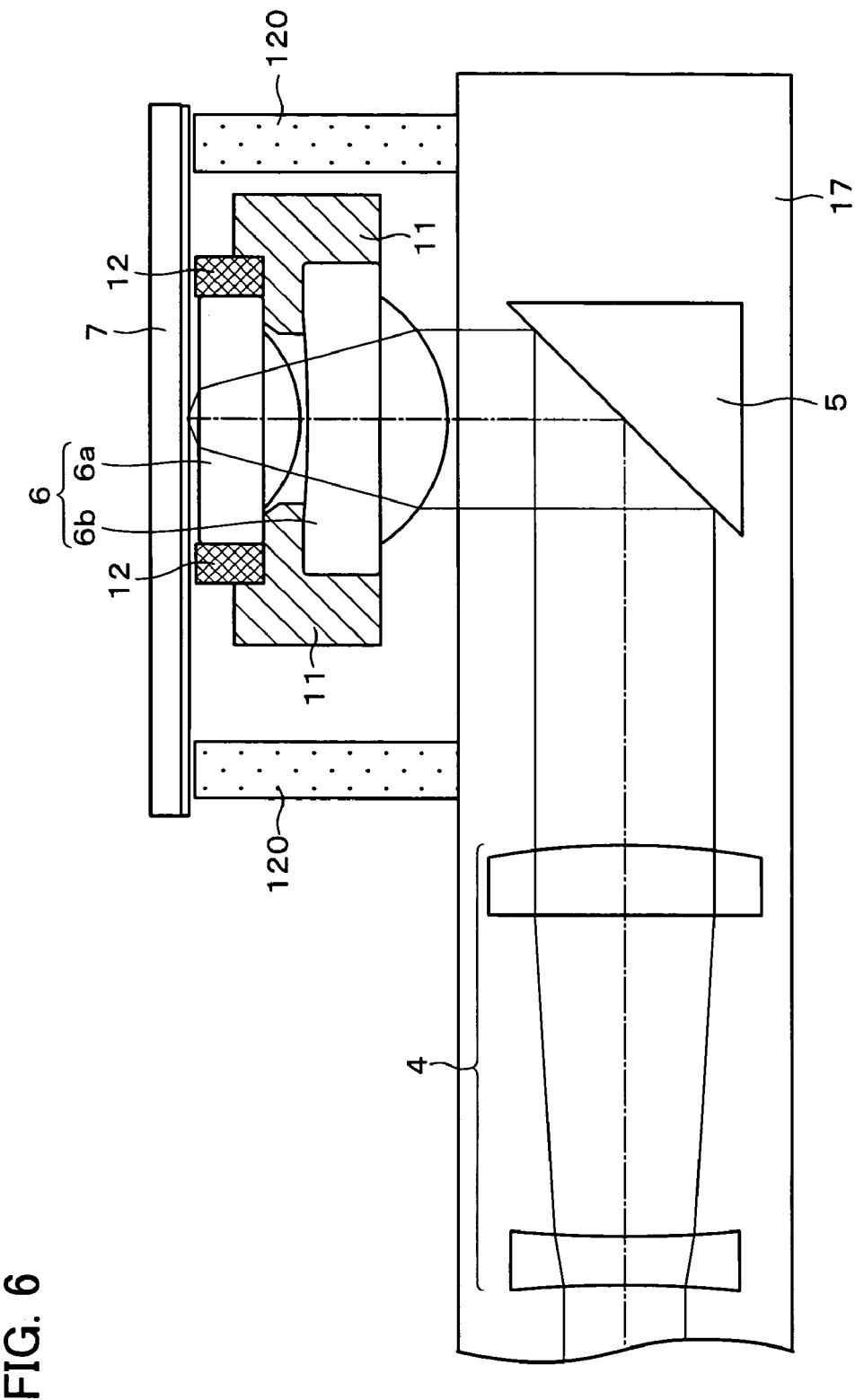
FIG. 6 is a longitudinal section schematically showing a structure in the vicinity of an objective lens in yet another embodiment of the present invention.
Figure 7:
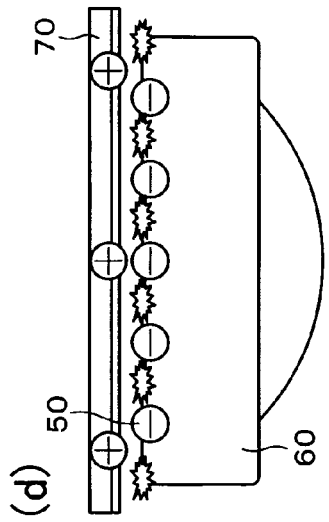
FIG. 7(a) through FIG. 7(f) are schematic views explaining how local charge is generated on an objective lens not provided with a shock absorber, and how the generated charge attracts dust to cause adverse effects on an optical disk.
Figure 7:
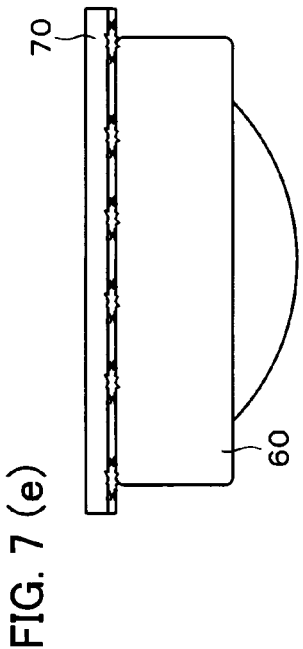
Figure 7:
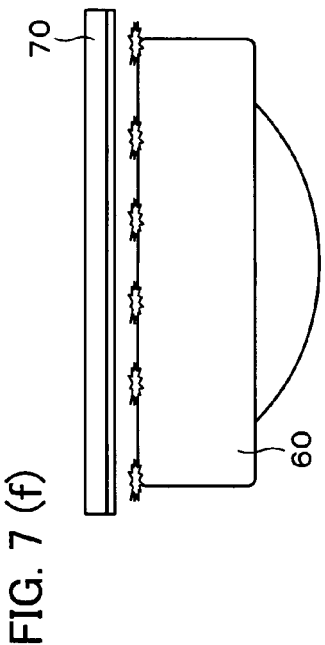
Figure 7:
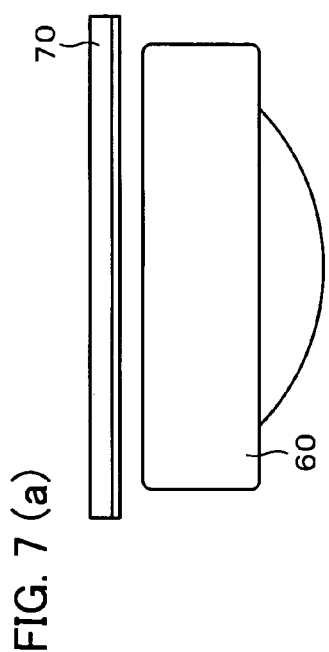
Figure 7:
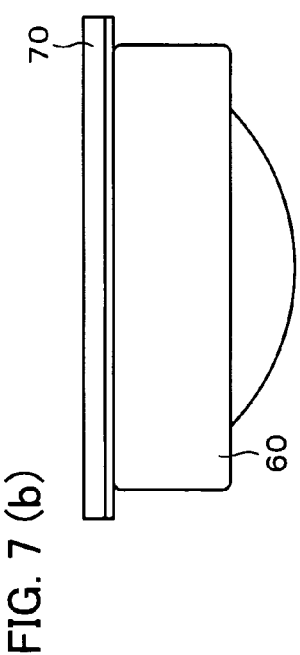
Figure 7:
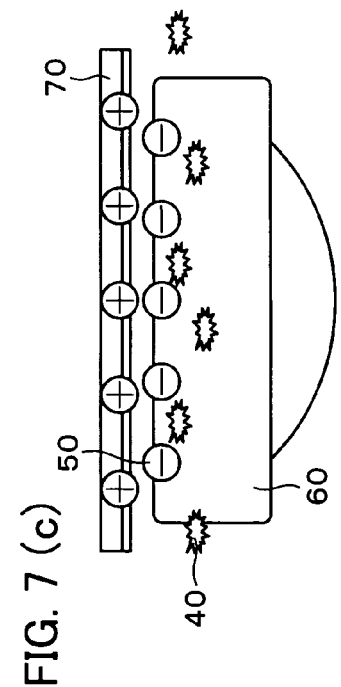
Figure 8:
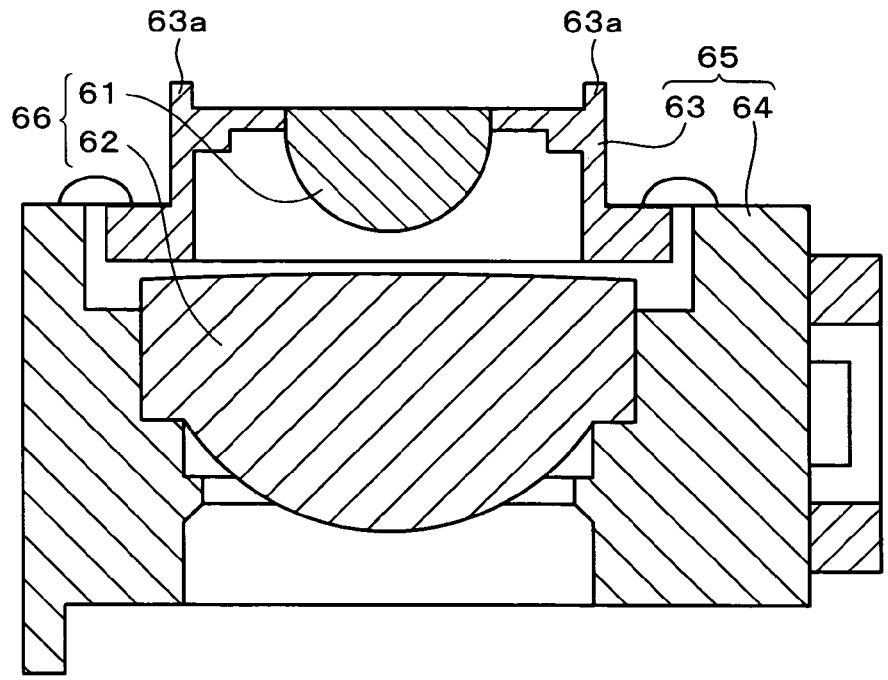
FIG. 8 is a cross sectional view showing a structure in the vicinity of an objective lens according to the prior art disclosed in Publication 1.
Figure 9:
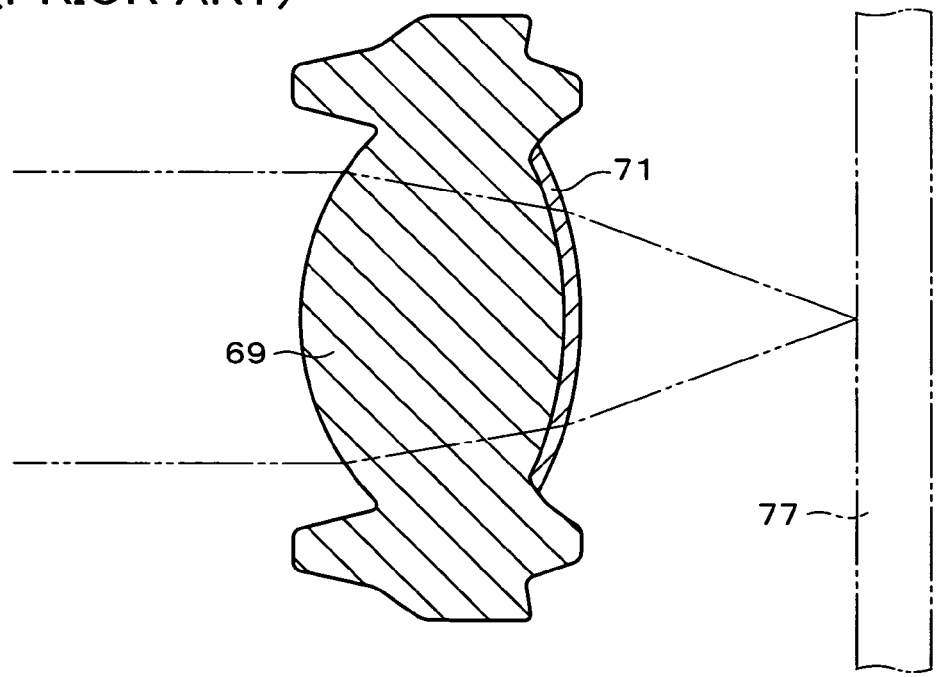
FIG. 9 is a cross sectional view showing a structure in the vicinity of an objective lens according to the prior art disclosed in Publication 2.

Further, in the present embodiment, in addition to the shock absorber 120 fixed on the housing 17 as illustrated in FIG. 6, a shock absorber 12 of a cylindrical shape may additionally be provided around the objective lens 6 and fixed on the objective lens holder 11.

With this structure, the optical disk 7 and the objective lens 6 can be protected more effectively by the two kinds of shock absorbers, the shock absorber 12 and the shock absorber 120.

Further, in the present embodiment, the shock absorber 120 is in the form of a pillar. However, the present invention is not just limited to this embodiment, and the shock absorber 120 may be shaped into a "mushroom" shape with a spherical end on the side of the optical disk 7. This is preferable because the shock absorber 120 should preferably have a shape that minimizes the pressure it exerts on the optical disk 7 when the shock absorber 120 contacts the optical disk 7.

Further, even though the shock absorber 120 is realized by four pillars in this embodiment, the present invention is not just limited thereto. For example, the shock absorber 120 may be realized by three pillars as long as the force of impact caused by the collision of the optical disk 7 and the shock absorber 120 is evenly distributed and the optical disk 7 is not damaged.

Further, even though the shock absorber 120 is made of industrial plastic or composite plastic, the present invention is not just limited to this embodiment. For example, resin, rubber, fabric, or any other material may be used as long as it is antistatic.

The optical pickup device of the present invention, in which the light of the light source is focused on a recording medium through the objective lens, may be adapted to include a shock absorber including a projection that projects toward a recording medium and projects out of a surface of the objective lens facing the recording medium, for preventing collision of the objective lens and the recording medium, the shock absorber having a surface resistivity of not more than $10^{10}$ Ω at least for the projection.

With this structure, because the shock absorber includes a projection that projects toward a recording medium and projects out of the surface of the objective lens facing the recording medium, the recording medium does not collide with the objective lens but collides with the projection when external vibrations or other disturbances move the objective lens out of the proper position determined by the focusing servo control. In this manner, the objective lens and the recording medium are prevented from directly colliding with each other.

As a result, the objective lens will not be damaged. Further, since the point of contact between the recording medium and the shock absorber is the projection having a relatively smooth surface, the recording medium is unlikely to be damaged by the contact with the projection.

According to the foregoing configuration, the shock absorber has a surface resistivity of not more than $10^{10}$ Ω at least for the projection.

The projection with a surface resistivity of not more than $10^{10}$ Ω provides a long mean free path for the free electrons on the surface of the shock absorber (projection, in particular), and accordingly the generated local charges when the projection is in contact with the recording medium spread over the surface of the shock absorber in a shorter period of time as compared with, for example, the projection with a surface resistivity exceeding $10^{10}$ Ω.

As a result, the projection will not be electrified even when the recording medium is in contact with the projection, and the charge of the projection does not attract dust or particles to the projection.

That is, dust or particles do not adhere to the projection by the charge generated when the recording medium is in contact with the projection, and the recording medium will not be damaged even when the projection collides again with the recording medium.

As a result, signals (information) can be recorded or reproduced without errors caused by the damage to the recording medium.

It is preferable in the optical pickup device of the present invention that the shock absorber is provided around and in contact with the objective lens.

With this structure, because the shock absorber is provided around and in contact with the objective lens, the size of the pickup device can be kept small.

It is preferable in the optical pickup device of the present invention that the shock absorber is provided in the form of a pillar around the lens holder supporting the objective lens, by being fixed on the housing on which the lens holder is fastened.

With this structure, the local charges generated by the collision of the objective lens and the projection can directly escape into the housing and cancel out without additionally providing wiring, etc., specifically for this purpose.

It is preferable in the optical pickup device of the present invention that the projection of the shock absorber is electrically connected to the conductive member in the optical pickup device.

With this structure, the local charges generated by the collision of the objective lens and the projection can escape through the conductive member, thereby more reliably preventing electrification of the shock absorber (projection).

In the case where the optical pickup device includes a conductive elastic body that movably supports the objective lens in a focusing direction and a tracking direction, it is preferable that the projection of the shock absorber is electrically connected to the conductive member via the elastic body.

With this configuration, the local charges generated by the collision of the objective lens and the projection can escape into the conductive member, for example, such as the housing, via the conductive elastic member, without additionally providing wiring, etc., specifically for this purpose, thereby more reliably preventing electrification of the shock absorber (projection).

It is preferable in the optical pickup device of the present invention that the objective lens has a numerical aperture of not less than 0.8.

The effects of the present invention to protect the optical disk with the use of the antistatic shock absorber become more prominent when the objective lens used in the optical pickup device has a numerical aperture of not less than 0.8, because in this case the optical disk and the objective lens (or shock absorber) collide more frequently as a result of the reduced working distance.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device comprising:
    a light source;
    an objective lens for focusing light of the light source onto an optical disk; and
    a shock absorber including a projection that projects toward a recording medium and projects out of a surface of the objective lens facing the recording medium, for preventing collision of the objective lens and the recording medium,
    the shock absorber having a surface resistivity of not more than $10^{10}$ Ω at least for the projection.

2. The optical pickup device as set forth in claim 1, wherein the shock absorber is provided around and in contact with the objective lens.

3. The optical pickup device as set forth in claim 1, further comprising:
    a lens holder for holding the objective lens; and
    a housing for fastening the lens holder,
    wherein the shock absorber is provided in the form of a pillar around the lens holder by being fixed on the housing.

4. The optical pickup device as set forth in claim 1, further comprising:
    a conductive member electrically connected to the projection of the shock absorber.

5. The optical pickup device as set forth in claim 4, further comprising:
    a conductive elastic body for movably supporting the objective lens in a focusing direction and a tracking direction,
    the conductive elastic body electrically connecting the conductive member with the projection of the shock absorber.

6. The optical pickup device as set forth in claim 1, wherein the objective lens has a numerical aperture of not less than 0.8.

* * * * *